United States Patent [19]

Hahn

[11] Patent Number: 4,536,370

[45] Date of Patent: Aug. 20, 1985

[54] CHEMICAL OXYGEN GENERATOR

[75] Inventor: Rainer Hahn, Lubeck, Fed. Rep. of Germany

[73] Assignee: Drägerwerk Aktiengesellschaft, Fed. Rep. of Germany

[21] Appl. No.: 462,762

[22] Filed: Feb. 1, 1983

[30] Foreign Application Priority Data

Mar. 25, 1982 [DE] Fed. Rep. of Germany ....... 3210959

[51] Int. Cl.³ ............................ B01J 7/00; A62B 7/08

[52] U.S. Cl. ................................ 422/120; 128/202.26; 422/165

[58] Field of Search ............... 422/120, 122, 126, 165, 422/166; 128/202.26

[56] References Cited

U.S. PATENT DOCUMENTS

| | | | |
|---|---|---|---|
| 3,482,568 | 12/1969 | Bovard | 422/120 X |
| 3,573,001 | 3/1971 | Bovard | 422/120 |
| 3,580,250 | 5/1971 | Oroza | 422/120 |
| 3,861,880 | 1/1975 | Thompson | 422/122 |
| 3,986,838 | 10/1976 | Reichert | 422/126 |
| 4,138,218 | 2/1979 | McClure | 422/120 |
| 4,246,229 | 1/1981 | McBride et al. | 422/126 X |
| 4,278,637 | 7/1981 | McBride | 422/122 |
| 4,427,635 | 1/1984 | Hahn | 422/120 X |

FOREIGN PATENT DOCUMENTS

| | | | |
|---|---|---|---|
| 1150873 | 1/1964 | Fed. Rep. of Germany . | |
| 2037891 | 7/1980 | United Kingdom | 422/120 |

*Primary Examiner*—Barry S. Richman
*Assistant Examiner*—William R. Johnson
*Attorney, Agent, or Firm*—McGlew and Tuttle

[57] ABSTRACT

A chemical oxygen generator includes a candle in which oxygen is present and which is chemically combined and which is ignited by starting means to initiate the generation of the oxygen. This takes several seconds before a substantial quantity of oxygen is provided. Because a user of this oxygen must be supplied with the oxygen for respiration immediately, the invention includes a generator which has a pressure space, preferably above, below and around the oxygen candle which is located in the space and which is filled with compressed oxygen. The generator includes a member which is actuated upon release of the starting means for the oxygen to permit outward flow of the oxygen in the pressure space which is supplied until the oxygen being released from the candle is produced by the ignition of the candle.

7 Claims, 1 Drawing Figure

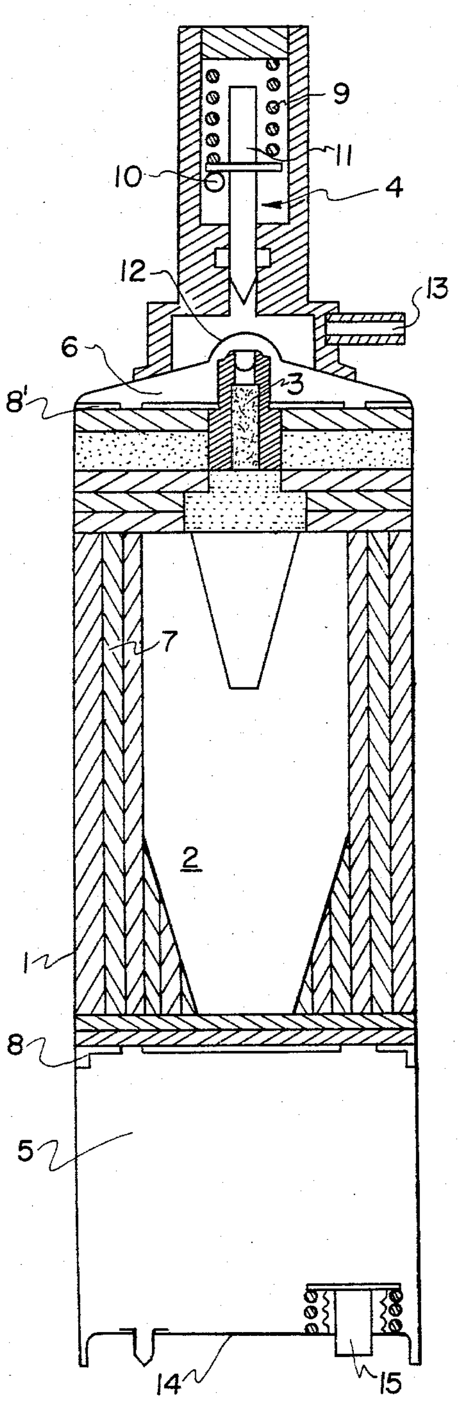
9
11
10
4
12
13
6
3
8'
7
2
1
8
5
14
15

CHEMICAL OXYGEN GENERATOR

FIELD AND BACKGROUND OF THE INVENTION

This invention relates in general to respirating devices and in particular to a new and useful device for generating oxygen for use in such respirating devices.

Chemical oxygen generators are used in respirators to make available an oxygen supply. In chemical oxygen generators the oxygen is present in a chemically combined form, for example in a chlorate candle or a $KO_2$ cartridge, and when needed is released in the course of a chemical reaction. A starting device sets the oxygen release in motion by manual triggering. It always takes several seconds before oxygen release takes place in the full amount required. This presents a difficulty for their use in respirators. The user cannot be supplied at once with the necessary respirable gas.

SUMMARY OF THE INVENTION

According to the invention, the empty space of the cartridge vessel is additionally filled with compressed oxygen during the stand-by time. The quantity is sufficient to supply the user with respirable gas during the first seconds after start of the oxygen generator until there is full $O_2$ by the chemical reaction.

Filling the empty space with compressed oxygen offers moreover an additional safety against access of moisture, which would be harmful for the chemical substances.

A known oxygen generator cell unit, which is lodged in a dispenser, has an expendable vessel, e.g. of tinplate, with a cylindrical sidewall, a closed bottom wall, and an upper end wall with a central opening. The opening is sealed by a foil that can be pushed through. An oxygen candle of compressed sodium or potassium chlorate, to which is admixed a sodium or potassium oxide, is retained in the vessel by means of elastic fiber mats in such a way that its flat sides are spaced from the vessel wall so that flow paths remain for the formed oxygen. At its head end the oxygen candle has an ignition cone, which is centered with the opening in the upper end wall of the vessel.

The dispenser in which the cell unit is lodged contains a concentrically surrounding cylindrical sidewall and perforated bottom and top walls. The top wall has a movable pressure bolt and a casing around the latter with an oxygen outlet pipe leading out.

To activate the oxygen generator cell unit, a bolt is pushed through a foil seal in the upper end wall of the vessel, and a glass bulb above an ignition cone is shattered. The ignition cone is activated, and by it the combustion of the oxygen candle is then initiated. The oxygen then released flows through the flow paths between the vessel and the oxygen candle and through the casing into the oxygen outlet pipe.

A disadvantage is that the evolved oxygen is not available at the moment the chemical reaction is triggered. It always takes several (up to 10) seconds before the oxygen generator reaches its full nominal delivery, and this is true also of the other known ignition by means of a primer, percussion cap or electrical incandescent wire. This known oxygen generator cell unit, therefore, is not suitable for cases where the oxygen is needed immediately, as for example for emergency supply in airplanes or in self-rescuers carried on the body. (German AS No. 26 20 300).

Another known oxygen emergency supply device has an oxygen reservoir consisting of individual pressure bottles. Connected to it are oxygen candles in tubular vessels. Normally, the oxygen reservoir is connected to the system on board as a main supply means. Upon failure of the board system, the oxygen candles are ignited and supply is assured thence via the oxygen reservoir utilizing the filling thereof with compressed oxygen. On jumping from the airplane with this emergency supply device, it is entirely separated from the board system. For this case it possesses two additional solid oxygen cartridges, so as to have a relatively large supply available. The total supply then comprises of the reservoir with the compressed oxygen, filled up from the board system, and the additional oxygen from the oxygen candles then to be ignited. A disadvantage is the complicated construction consisting of the storage bottles individually connected with one another and the solid oxygen cartridges (German PS No. 19 53 754).

Another chemical oxygen generator contains a tightly closed pressure vessel, a conventional oxygen cartridge, or an oxygen candle in a vessel. It is equipped with the usual ignition means.

The oxygen cartridge is supported concentrically in the pressure vessel by ceramic fiber mats. The empty space between the pressure vessel and the cartridge container is filled with compressed oxygen before being made ready. As ignition is triggered, a valve opens toward the outlet, so that the oxygen can flow to the consumer. When the pressure of the oxygen evolving from the oxygen candle in the cartridge exceeds the decreasing pressure in the empty space, it opens a membrane, so that the oxygen can then flow off via the empty space and the outlet. This oxygen generator is compact but short. For cases where a smaller volume widthwise but a possible greater length is required this is disadvantageous. (German No. P 30 45 111).

The invention provides a device to supply the user of the respirator in which a chemical oxygen generator is employed, from the start of use, that is immediately after actuation of the starting means, with a respirable gas, hence with sufficient $O_2$ content, in adequate quantity. The chemical oxygen generator, as a device to be carried on the body should not be cumbersome and be as small as possible in its external dimensions.

In accordance with the invention, a chemical oxygen generator comprises a pressure vessel which has an outlet which is connected to an interior pressure space in which is positioned an oxygen generating candle. The device includes a starter for the oxygen candle which is set off by a releasable member of a trigger mechanism. In accordance with the invention a membrance is located in the path of movement of the starter and this normally seals the pressure space in the container from the outlet. The membrane is ruptured at the time the oxygen candle is ignited so that the oxygen in the pressure space flows out of the outlet as soon as the starter means is put in motion.

By a simple construction with smallest external dimension of the chemical oxygen generator and the additional previous filling of the empty spaces in the pressure vessel, the supply of the user with oxygen until the chemical oxygen delivery starts is assured. In addition, the user is satisfactorily supplied by the oxygen additionally already present previously during the first seconds until the chemical oxygen production sets in.

Accordingly, it is an object of the invention to provide a chemical generator which includes an oxygen supply which is liberated at the same time that an oxygen generating candle is ignited.

A further object of the invention is to provide a chemical oxygen generator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE of the drawing is a transverse sectional view of a chemical oxygen generator constructed in accordance with the invention.

DESCRIPTION OF THE PREFERRED EMBODIMENT

Referring to the drawing in particular, the invention embodied therein comprises a chemical oxygen generator generally designated 1 which comprises a pressure vessel having an outlet 13 which is communicatable with an interior pressure space which in the embodiment illustrated comprises a lower space 5, an upper space 6 and an intermediate space 7 around an oxygen generating candle 2. The oxygen candle 2 is ignitable by a starter 3 which is set off by a trigger mechanism 4. The space 7 also contains support elements which are cross-hatched and located around the candle 2. In accordance with a feature of the invention, the pressure space is filled with a compressed oxygen and the starter mechanism trigger ruptures a membrane 12 which comprises a removable or rupturable member which blocks the communication of the pressure space to the outlet 13.

In a pressure vessel 1 is lodged an oxygen candle 2. It comprises the usual starting means 3, actuated by a trigger 4. A lower empty space 5 and an upper empty space 6 in the pressure vessel 1 are filled with compressed oxygen in the readiness state together with the free space 7 around the oxygen candle 2. Thus, the spaces 5, 6 and 7 are in common open flow communication with each other and with the oxygen candle 2 and such spaces are filled in a ready state with the stored oxygen under pressure prior to starting the operation of the oxygen candle 2. The empty spaces 5 and 6 are connected together via the free space 7 through vertically spaced perforated disks 8 and 8' mounted with the vessel and supporting the oxygen candle 2. Trigger 4 comprises a striker 11 actuated by a compression spring 9 and held in an inoperative position by a release pin 10. After the release pin 10 has been pulled, the striker 11, cutting open a membrane 12, strikes against the starting means 3 and causes it to ignite. The compressed oxygen contained in the spaces of the pressure vessel 1 and the oxygen being released later from the oxygen candle 2 then flow through an outlet 13 to the consumer.

A lower button or bottom wall 14 provides a closure of the lower empty space 5 and carries a pressure gauge 15.

While a specific embodiment of the invention has been shown and described in detail to illustrate the application of the principles of the invention, it will be understood that the invention may be embodied otherwise without departing from such principles.

What is claimed is:

1. A chemical oxygen generator comprising a pressure vessel having an outlet, manually releasable starting means associated with said pressure vessel, an oxygen candle supported in said pressure vessel in a position leaving a lower empty space therebelow and an upper empty space thereabove as well as a free space around said oxygen candle, the empty spaces and said free spaces being in common open flow communication with each other and with said oxygen candle and being filled in a ready state with compressed oxygen which can flow out through said outlet, a severable membrane closing the spaces to said outlet, and starting means for starting the operation of said candle being movable to sever said membrane to permit flow out of said outlet.

2. Generator of claim 1 wherein said starting means includes a striker for lighting said candle which is movable to cut open said membrane when said candle is lighted.

3. Generator of claim 1 including a pressure gage connected into said spaces.

4. A chemical oxygen generator comprising a pressure vessel having an outlet and an interior pressure space connected to said outlet, an oxygen generating candle which is ignitable to generate oxygen filling a part of said pressure space, oxygen under pressure maintained in at least a portion of the remainder of said pressure space and being in common open flow communication with said oxygen generating candle filling said part of said pressure space, a severable member blocking communication of said pressure space with said outlet which is severable to permit flow of oxygen out of said pressure space through said outlet, and starting means for starting the ignition of said candle and being movable to sever said severable member and permit outflow of oxygen through said outlet.

5. Generator of claim 4 including an ignition charge connected to said oxygen generating candle, said severable member comprising a membrane overlying said charge, a striker member mounted over said membrane and said charge and being movable to penetrate said membrane and ignite said charge whereby to initiate said generation of the oxygen by said oxygen generating candle and to open the pressure space containing said oxygen under pressure for flow of the oxygen immediately out through said outlet.

6. Generator of claim 4 including perforated discs in said pressure space located above and below said oxygen generating candle dividing said pressure space into an upper pressure space, a central pressure space having said candle and a lower pressure space.

7. Generator of claim 6 said starting means including a starter for igniting said candle connected to said candle, a trigger mechanism located above said starter including a striker which is movable to contact and initiate said starter, said severable member comprising a membrane located between said trigger and starter closing off said pressure space from said outlet, said trigger being movable to penetrate said membrane to open the pressure space to said outlet.

* * * * *